*INVENTOR.*
ALFRED G. EMSLIE
BY
William D. Hall
ATTORNEY

Patented May 29, 1951

2,555,121

UNITED STATES PATENT OFFICE 2,555,121

MOVING TARGET INDICATION RADAR SYSTEM

Alfred G. Emslie, Boston, Mass., assignor, by mesne assignments, to the United States of America as represented by the Secretary of War Application October 19, 1945, Serial No. 623,397

5 Claims. (Cl. 343—9)

The present invention relates to a radio receiver and it relates more particularly to a receiver which limits incoming signals, and which is embodied in a system adapted to distinguish fixed objects from moving objects.

Such a system is often referred to as a moving target indication (MTI) system. Briefly, in such a system high carrier frequency exploratory pulses of radiant energy are transmitted in the usual manner of a radio object locating system. In addition, however, reference oscillations having a fixed phase relation with each exploratory pulse are provided. Such reference oscillations may be locally generated in the receiver or they may consist of echo pulse oscillations received from fixed objects. Systems using locally generated oscillations are referred to as coherent pulse echo systems and the oscillator providing the reference oscillations is referred to as a coho (contraction of the term "coherent oscillator"). Systems of the latter type (using fixed object echoes) are referred to as non-coherent pulse echo systems.

Echo pulses returned from objects are combined with the reference oscillations, the echo pulses reinforcing or opposing the reference oscillations to a degree depending upon the relative phase between the two. The relative phase from pulse to pulse varies for echo pulses received from moving objects, whereas echo pulses from stationary objects do not vary in phase. The combination of the reference oscillations and the echo pulses may then be detected to produce video pulses. Video pulses manifesting moving objects have a cyclical variation in amplitude, whereas video pulses manifesting fixed objects are non-varying in amplitude. These video pulses may then be visually presented on a cathode ray tube indicator. The principles of such a moving target indication system are more fully described in a copending application of Robert H. Dicke, Serial No. 590,052, entitled "Communication System," and filed April 24, 1945, now Patent No. 2,535,274, granted December 26, 1950.

In many instances it is desirable to see on the indicator only signals manifesting moving objects. The advantage of this is obvious as it prevents the "loss" of potential moving targets among video signals manifesting fixed permanent objects. In order to indicate moving objects only, a moving object selector may be provided. Such a moving object selector detects the amplitude difference between successive video pulses in order to obtain a residual signal which may be applied to an indicator. As there is no amplitude difference between video pulses manifesting stationary objects there is no residual signal, and hence the moving object selector provides an output for moving objects only, and these only are shown on the indicator. There are various ways of accomplishing this moving object selection, one of which is more fully described in a copending application of Alfred G. Emslie, Serial No. 594,266, entitled Moving Object Detection System, and filed May 17, 1945, which issued June 20, 1950, as Patent No. 2,512,144.

Although theoretically speaking, video pulses representing stationary objects are non-varying in amplitude, they actually vary to a certain degree. This amplitude variation is due to a number of reasons, one of which by way of example consists of noise generated in the receiver. This noise is caused by various components in the receiver and is independent of the amplitude of the received echo pulses. Another cause of amplitude fluctuation of pulses representing fixed objects is due to the fact that some so-called permanent echoes are not actually stationary, but in fact move to some extent. As an example of this, trees, tall towers, etc., may be swayed by the wind. This causes the phase of the echo pulses relative to the reference oscillations to vary somewhat and to hence cause varying amplitude video signals. Hereinafter echo pulses from objects other than actual desired moving objects will be referred to by the general term "clutter."

Another cause of undesirable fluctuation is caused by the scanning of the directional beam of radiant energy. Inasmuch as the exploratory pulses have a definite duration or width, received echo pulses are made up of component echo pulses received from a number of scattering elements included in an area energized by an exploratory pulse. As the antenna beam scans, new elements are energized by the beam and others drop out. This means that the components of the resultant received signal vary in amplitude and in phase thereby causing a resultant variation in the resultant received echo pulse.

These amplitude fluctuations are undesirable for they caused fixed object echoes to have certain characteristics of moving object echoes. Consequently the moving object selector provides an output for stationary objects and hence they are not totally eliminated from the viewing screen.

It was heretofore stated that the noise was independent of the amplitude of the received echo pulses. The latter described fluctuations, (scanning, wind, etc.) however, are percentage-wise fluctuations, i. e., the larger the received signal the larger the undesired fluctuation in amplitude. As a result, there is no way of readily removing these undesired fluctuations without first reducing them to a constant level.

It is, therefore, an object of the present invention to provide a receiver having a characteristic wherein the pulse-to-pulse fluctuation at the output is independent of the size of the clutter amplitude.

It is another object of the present invention to provide a receiver which reduces percentage-wise fluctuations to a substantially constant level.

It is another object of the present invention to provide a receiver which is responsive to variations in phase of received echo pulses.

It is still a further object to provide a receiver which is adapted to convert phase variations into amplitude variations.

The invention, however, will be more fully understood from the following detailed description when taken in connection with the accompanying drawings wherein.

Figure 1:
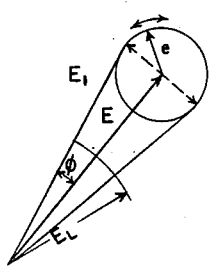
Fig. 1 is a diagrammatic illustration of phase and amplitude variations of a received echo pulse.

Referring now to Fig. 1 which illustrates phase and amplitude variations of received echo pulses, the vector designated E may be considered as comprising the major and non-varying portion of a signal received from a stationary object, and the vector shown as $e$ may be considered as being the undesirable fluctuation which appears on top of the main signal E. Vector $e$ may be considered as being a revolving vector and the resultant signal appearing at the receiver is then the vector sum of E and $e$. It can be seen that the resultant vector shown as $E_1$ in the figure varies in both amplitude and phase, the total phase variation in the instance shown being equal to $2\phi$, where $\phi$ is the angle $\phi$ shown in Fig. 1.

This phase change $2\phi$ may be considered as being the maximum phase change of the received signal, due to the undesirable fluctuations (represented as $e$) appearing on top of the fixed object echo pulses (represented as E). Thus, Fig. 1 illustrates diagrammatically the phase and amplitude modulation of a resultant received echo signal.

As $e$ represents undesired percentage-wise fluctuation, an increase in vector E causes a corresponding increase in vector $e$, but such an increase does not reflect a change in the phase angle $\phi$. Thus it can be seen that although the amplitude fluctuation is a percentage-wise function, and increases with an increase in the size of the received echo, the amount of phase modulation of the returned echo ($E_1$) remains substantially constant.

One principle of the present invention is to limit the size of the received signals to a certain predetermined level. This level may be designated as $E_L$ as shown in Fig. 1. The effect of such limiting is to remove the amplitude modulation of all signals above the predetermined level $E_L$ thereby leaving a resultant phase modulated signal having a constant magnitude $E_L$. Signals below this predetermined level still have both phase and amplitude modulation. This phase modulation is then converted to an amplitude modulation and as the phase fluctuation from pulse-to-pulse is independent of the clutter amplitude, the amount of undesirable amplitude fluctuation does not exceed a predetermined value.

Figure 2:
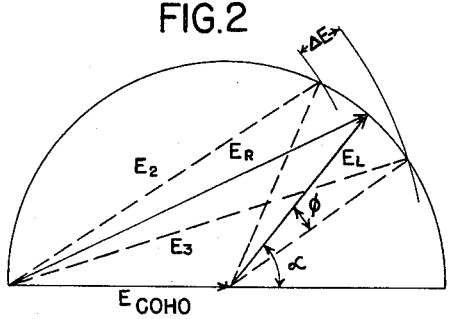
Fig. 2 is a diagrammatic illustration showing how phase modulation may be converted to amplitude modulation.

An understanding of how phase modulation may be converted to amplitude modulation may be obtained from Fig. 2. Generally speaking, such conversion is accomplished by combining the limited amplitude signal $E_L$ with the previously referred to coherent reference oscillations present in moving target indication systems. In Fig. 2 the coherent reference oscillations are represented by the vector $E_{coho}$. The limited signal $E_L$ is likewise shown and the angle $\alpha$ is the phase angle between the incoming limited signal $E_L$ and the coherent reference oscillations $E_{coho}$. The angle $\alpha$ is random and is dependent upon the distance of a particular reflecting object from the radio object locating system. Due to the fact that the limited signal $E_L$ varies in phase as described above, there is an incremental variation in $\alpha$ and this incremental variation may be represented as the angle $\phi$.

In the figure $E_{coho}$ is shown to be of the same magnitude as $E_L$. The limited input signal $E_L$ and the reference oscillations $E_{coho}$ are combined to give a resultant signal $E_R$ which varies both in amplitude and in phase. The two extremes in amplitude variation due to the total incremental change $2\phi$ are shown respectively as $E_2$ and $E_3$ and the difference between $E_2$ and $E_3$ is shown in the drawing as $\Delta E$. In accordance with the foregoing description regarding the nature of the percentage-wise fluctuations which are manifested by the change in phase, it is evident that $\Delta E$ is the variation in signal amplitude due to the percentage-wise fluctuations.

As the variation in amplitude $\Delta E$ is caused by the changing phase of the signal $E_L$ and as this phase change is independent of the size of the received echo pulses, it follows that $\Delta E$ is likewise independent of the size of the received pulses. It is thus apparent that percentage-wise variations in amplitude of a signal returning from a given object may be reduced to a predetermined value and it is then possible to remove these undesired fluctuations by employing a fixed-value threshold selector, the general nature of which is more fully described hereinafter.

Figure 3:
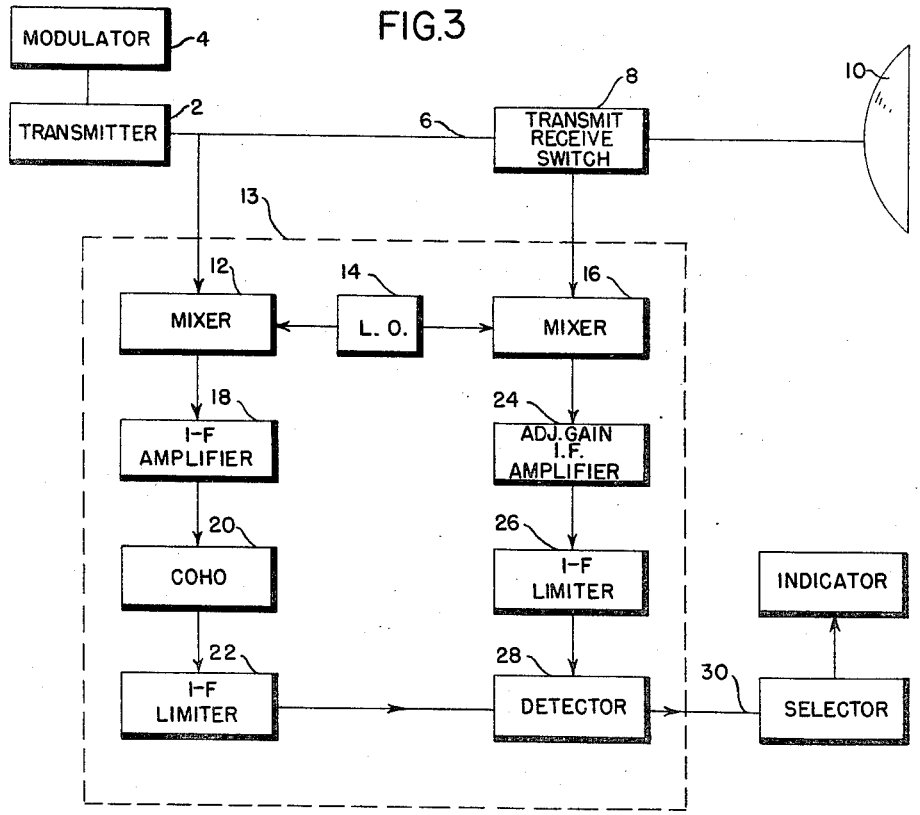
Fig. 3 is a schematic diagram in block form of one embodiment of the present invention.

Reference is made to Fig. 3 which shows a radio object locating system of the general character described and which embodies a receiver having the desired characteristics. In the figure, transmitter 2, periodically actuated by modulator 4, provides short duration high carrier frequency exploratory pulses of radiant energy which are fed by transmission line 6 through transmit-receive switch 8 to directional antenna 10.

Transmit-receive switch 8 serves to connect transmitter 2 to directional antenna 10 during the transmission of exploratory pulses and to disconnect a portion of the receiver channel presently to be described. During the interim between transmitted pulses and while echo pulses are being received, transmit-receive switch 8 connects directional antenna 10 to the receiver channel and disconnects transmitter 2.

A portion of each exploratory pulse issuing from transmitter 2 is applied to mixer 12, which forms a part of receiver 13. A second input to said mixer consists of continuous wave oscillations from local oscillator 14, and the beat frequency output of mixer 12 consists of synchronizing pulses having an intermediate frequency characteristic.

Object-returned echo pulses received at directional antenna 10 are applied to mixer 16, a second input to said mixer consisting of a second continuous wave output from local oscillator 14. The beat frequency output of mixer 16 comprises echo pulses having an intermediate frequency characteristic. The synchronizing pulses may be applied to intermediate frequency amplifier 18, the output of which serves as a synchronizing (locking) signal for coherent oscillator (coho) 20. The output of said coherent oscillator comprises continuous wave reference oscillations having a fixed phase relationship with respect to the transmitted exploratory pulses. These reference oscillations are then applied to intermediate-frequency limiter 22 to provide as an output therefrom reference oscillations having a predeterminable amplitude. These oscillations are vectorially represented in Fig. 2 as $E_{coho}$.

The received echo pulses having an intermediate frequency characteristic are fed from mixer 16 to intermediate-frequency amplifier 24. These amplified pulses are then applied to intermediate-frequency limiter 26 which provides as an output therefrom echo pulses having a predeterminable amplitude which are vectorially represented in Fig. 2 as $E_L$.

The outputs of limiter 26 and limiter 22 are then applied to, and combined in, mixer or detector 28. The limited amplitude reference oscillations, and the limited amplitude echo pulses, then combine therein to a degree depending upon the phase relationship between the two, to provide a resultant output which is represented in Fig. 2 as $E_R$. As the resultant combination is detected in detector 28, the phase significance of the signal is lost therein and the resultant output consists of a video signal having only amplitude modulation. The video output from receiver 13 is taken by means of connection 30 from detector 28.

The video signals may then be applied to a moving object selector which normally provides an output only for video pulses manifesting moving objects. However, due to the fact that video pulses manifesting stationary objects actually have variations in amplitude for reasons as heretofore described, a residual undesired fluctuation is obtained as an output from the moving object selector. As the present invention reduces the undesired fluctuations to a substantially constant value, they may readily be removed from the indicator.

This may be accomplished by adjusting the noise level of the receiver to be equal to the average amplitude of the undesired fluctuations. One manner of doing this is to make the gain of intermediate-frequency amplifier 24 variable. The amplifier gain may then be adjusted until the noise appearing at the output of receiver 13 is equal in amplitude to the average undesired fluctuations. As a result the undesired fluctuations do not appear above the noise level, and hence cannot be mistaken for moving objects. Such action may be referred to by the general term of fixed-value threshold selection.

In moving target indication systems PPI (plan position indicator) cathode ray tubes are used. In such indicators range and azimuth formation is indicated in polar form, thereby providing a map-like presentation of the located objects. Such tubes are intensity modulated and these tubes are normally operated so that the noise (being lower in amplitude than the video signals) does not actuate the tube to any great degree. In general, the operation of these tubes is such that noise appears as fine grained light spots covering the indicator screen, whereas video signals manifesting located objects are of much brighter intensity.

As the undesired fluctuations are reduced to a substantially constant predeterminable value, and as the noise level is adjusted to be equal to this predetermined value, the undesired fluctuations do not appear on the indicating screen as moving objects.

While there has been here described one embodiment of the present invention, it will be manifest to those skilled in the art that various changes and modifications may be made therein without departing from the invention. It is therefore aimed in the appended claims to cover all such changes and modifications as fall within the spirit and scope of the invention.

What is claimed is:

1. In a radio object locating system which transmits exploratory pulses of carrier frequency radiant energy and receives corresponding echo pulses, and wherein successive echo pulses manifesting certain fixed objects have undesirable fluctuations in amplitude and phase, the degree of undesirable amplitude fluctuations being substantially proportional to the amplitiude of the received echo pulses, the degree of undesirable phase fluctuations being substantially independent of the amplitude of the received echo pulses, a receiver for said echo pulses, said receiver including means for limiting the amplitude of received echo pulses that have an amplitude greater than a predetermined amplitude to said predetermined amplitude, whereby said undesirable fluctuations in the amplitude of said pulses are removed and said undesired phase fluctuations remain, means for generating sinusoidal reference oscillations synchronized in a fixed phase relationship with the carrier of said exploratory pulses, means for combining in an additive manner said reference oscillations and said limited echo pulses, and means for detecting said combination to obtain pulses having an amplitude modulation which corresponds to said undesired phase fluctuations only, and whereby the amplitude fluctuations are independent of the amplitude of the received echo pulses.

2. A radio object locating system comprising a transmitter of carrier frequency exploratory pulses of radiant energy and a receiver for corresponding echo pulses, and wherein successive echo pulses manifesting certain fixed objects have undesirable fluctuations in amplitude and phase, the degree of undesirable amplitude fluctuations being substantially proportional to the amplitude of the received echo pulses, the degree of undesirable phase fluctuation being substantially independent of the amplitude of the received echo pulses, said receiver having means for reproducing echo pulses from moving objects and limiting the amplitude of signals due to echo pulses from fixed objects, said means including means for limiting received echo pulses that have an amplitude greater than a predetermined amplitude to said predetermined amplitude whereby said undesirable fluctuations in the amplitude of said pulses are removed and only phase modulations remain, and means for transforming said phase modulations of successive echo pulses into amplitude modulation of said successive echo pulses, said amplitude modulation corresponding to said phase modulations only, and means for indicating said amplitude modulations, whereby the amplitude modulations are independent of the amplitude of the received echo pulses.

3. A radio object locating system comprising a transmitter of carrier frequency exploratory pulses and a receiver for said exploratory pulses which is responsive to phase variations of signals which have an amplitude greater than a predetermined amplitude and which is non-responsive to variations in the amplitude of said signals including, means for reducing the carrier frequency of received signals to an intermediate frequency, means for limiting said intermediate frequency signals to said predetermined amplitude, means for generating a reference signal synchronized in a fixed phase relation with the carrier of the exploratory pulses and having a frequency substantially equal to said intermediate frequency, means for combining said limited intermediate frequency signals and said reference signals in an additive manner, and means for detecting the resultant combination to obtain output signals whereby said output signals have an amplitude variation which is a function of the phase of said received signals and which is independent of their amplitude.

4. A radio object locating system comprising a transmitter of carrier frequency exploratory pulses and a receiver for said exploratory pulses which is responsive to phase variations of signals which have an amplitude greater than a predetermined amplitude and which is non-responsive to variations in the amplitude of said signals, said receiver having means for reproducing pulses echo signals from moving objects and suppressing pulse echo signals from fixed reflecting objects, said means including means for limiting the amplitude of said signals to said predetermined amplitude whereby said limited signals have only a phase variation, and means for transforming said phase variation to an amplitude modulation, and means for indicating amplitude modulations having magnitudes greater than a predetermined value, whereby said amplitude modulation is a function of the phase of said received signals and is independent of the amplitude thereof.

5. The apparatus defined in claim 4 in which said receiver includes an amplifier preceding said means for limiting the amplitude of said signals, the amplification of said amplifier being of such a magnitude that the amplitude modulation due to receiver noise currents is substantially equal to the amplitude modulation due to received echo signals from fixed objects.

ALFRED G. EMSLIE.

REFERENCES CITED

The following references are of record in the file of this patent:

UNITED STATES PATENTS

| Number | Name | Date |
|---|---|---|
| 2,406,019 | Labin | Aug. 20, 1946 |